United States Patent Office 3,363,420
Patented Jan. 16, 1968

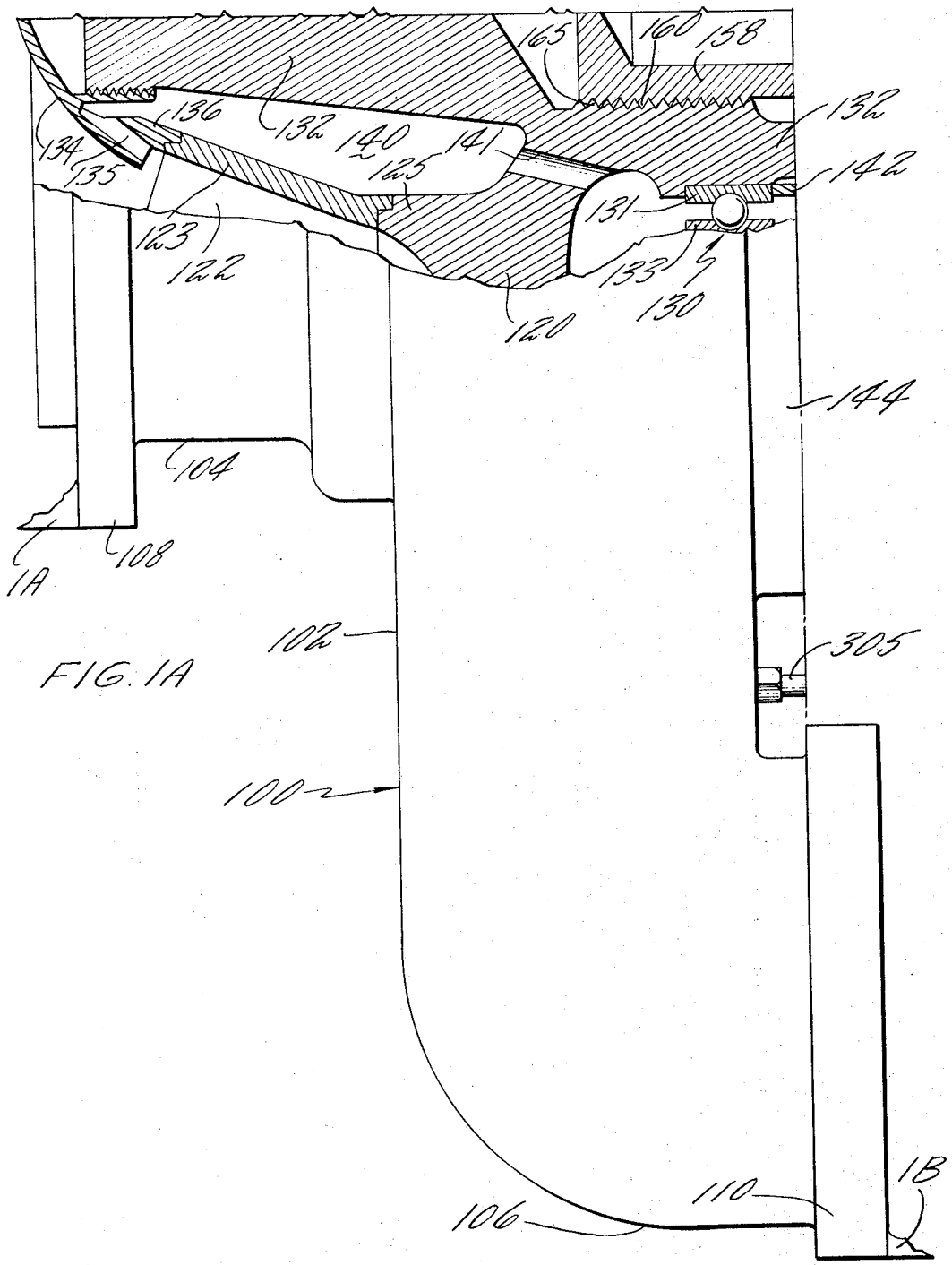

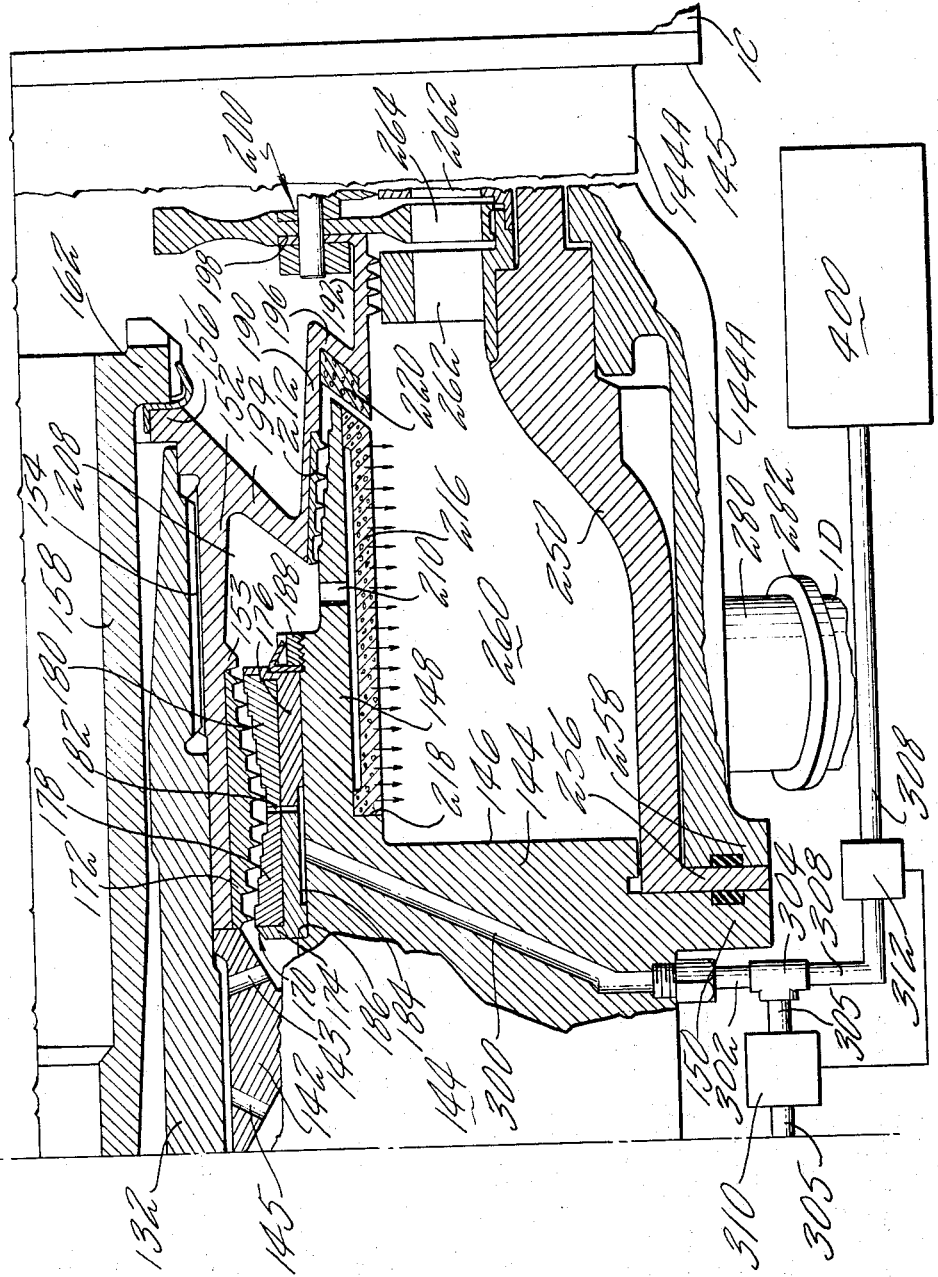

3,363,420
COMBUSTION SEAL
David L. Bogue, Jupiter, Fla., assignor to United Aircraft Corporation, East Hartford, Conn., a corporation of Delaware
Filed Jan. 11, 1965, Ser. No. 424,576
16 Claims. (Cl. 60—259)

This invention relates to a sealing arrangement for a pump and more particularly a propellant pump which includes a means for reclaiming leakage therefrom for burning.

An object of this invention is to collect propellant pump leakage and mix it with a hot fuel rich gas for burning.

Another object of this invention is to provide means for burning propellant leakage without destroying adjacent parts.

A further object of this invention is to provide as a part thereof a mechanical seal which is supplied from a source having a sufficient pressure to insure that hot gas from the burning or mixing chamber cannot back up through the sealing arrangement.

Another object of this invention is to pass the propellant leakage through a porous inert high temperature material into a burner or mixing chamber so that combustion can occur at the surface of the porous material without exceeding material limitations.

A further object of this invention is to provide a purging system which will permit a purging fluid to pass through the course taken by the leaking propellant so that the hot fuel rich gas will not flow in a reverse direction through the porous liner of the burner prior to pump starting.

Another object of this invention is to permit the use of one propellant to drive a turbine which in turn rotates the pump for a second propellant without the need of a complex leakage disposal system, while maintaining engine reliability, said propellants being capable of self ignition upon mixing.

Other objects and advantages will be apparent from the specification and claims and from the accompanying drawing which illustrates embodiments of the invention.

FIGURES 1A and 1B are sectional views of the invention below the center line with the pump and turbine only partially in section.

In FIGURES 1A and 1B, a centrifugal pump 100 with a housing 102 having inlet 104 and outlet 106 is fixed to engine structure by a flange 108 on the inlet and a flange 110 on the outlet. The pump housing 102 has an impeller 120 rotatably mounted therein on an annular bearing unit 130 which is positioned between the interior of the pump housing and pump shaft 132. The inner ring 131 of the bearing unit is fixed to the shaft and outer ring 133 is fixed in the housing. An inducer section 122 is positioned around the end of the shaft 132 projecting from the impeller and has its annular root member 123 mating at its inner end with the base of the impeller extending forwardly at 125. A cap member 134 is threadably secured to the free end of the shaft 132 and has an inwardly extending conical flange 136 which mates with the outer end of the annular root member 123 of the inducer section 122. Cap 134 maintains the pump unit in its operating position. The conical flange 136 of the cap 134, the annular root member 123 of the inducer 122, and the root of the impeller form an annular chamber 140 with the end of the shaft. A plurality of passageways 135 connect the chamber 140 through the cap 134 to the inlet of the pump 100. A plurality of passageways 141 connect annular chamber 140 with the other side of the impeller 120. These passageways 135 and 141 are for a purpose to be hereinafter described. In this construction, the impeller is formed integrally with the shaft.

A housing extension 144 is fixed to the pump housing and extends away from the housing surrounding the shaft 132 and terminates at its free end with a flat wall 146 having an inner annular projection 148. An outer radial flange 150 extends from the side of the housing extension 144 for a purpose to be hereinafter described.

Fixed on the shaft 132 adjacent the bearing unit 130 is a thrust compensating member 142 having an annular flange extending into housing extension 144. This thrust compensating means can be any one of a number of well-known means. The base of the compensating member 142 is spaced from shaft 132 and is provided with passages 143 and 145 which connect the space between said member 142 and shaft 132 with each side of the member to permit flow thereby for a purpose to be hereinafter described.

Positioned on the shaft 132 adjacent the thrust compensating member 142 and spaced from the extension 144 is a drive transmitting sleeve member 152. This member 152 is splined to the inner end of shaft 132 at 154. This member 152 has an inwardly extending annular flange 156 which extends over the end of the shaft 132. Shaft 132 is hollow at its inner end and has internal threads 165. A bolt member 158 extends into the hollow shaft 132 and has threads 160 which threadably engage the threads 165 of the shaft. An outwardly extending annular flange 162 on the outer end of bolt member 158 engages flange 156 as the bolt member is threadably positioned in place. It can be seen that this action positions the inner ring 131 of the bearing unit 130, thrust member 142 and drive transmitting member 152 on the shaft 132.

A labyrinth seal arrangement 170 is located between the surface adjacent the end of sleeve member 152 on shaft 132 and a facing annular surface on the housing extension 144. The inner annular member 172 of the seal arrangement which rotates is fixedly positioned on the sleeve member 152 between an annular abutment 153 thereon and a part of the thrust member 142 which extends above the thickness of the sleeve member 152. This rotating member 172 includes the annular discs of the labyrinth unit. These discs decrease in diameter from a point at which a high pressure fluid is directed for a purpose to be hereinafter described.

The mating fixed portion of the labyrinth seal is formed on two halves. Each half is formed having steps of increasing diameter towards the center, one for each of the discs of the rotating member 172. Each half is formed having an outer supporting ring member 174 and 176, with inserts 178 and 180, respectively, which can be made of various acceptable materials for the type of fluid being sealed.

One half of the fixed portion of the seal has a plurality of radially extending grooves on the face thereof which form passages 182 when the two halves are placed together. Further, an annular groove 184 is formed in the external surface of the assembled halves for a purpose to be hereinafter described. These halves of the fixed portion of the labyrinth seal are fixed in place between an annular shoulder 186 on the extension 144 and a ring nut 188 which is threaded within the housing extension 144 at the other end.

Drive transmitting sleeve member 152 has formed integral therewith at its outer end two annular members 190 and 192. A radially extending flange 194 interconnects the end of member 152 with one end of annular member 190 and a radial member 196 connects the other end of annular member 190 with the inner end of annular member 192. The free end of annular member 192 has an inwardly extending flange 198 thereon which is fixed to the turbine rotor of the turbine 200 which provides the driving action for the pump 100. The turbine construction is similar to that as shown in U.S. Patent No. 2,885,768. The turbine rotor is supported for rotation within housing sleeve 144A which will be hereinafter described.

The radially extending flange 194 forms an annular chamber 208 with member 152, the end of labyrinth seal arrangement 170, and the inner center portion of annular projection 148 of the housing extension 144. A plurality of openings 210 extend through the projection 148 between the chamber 208 and the outer surface of the projection for a purpose to be hereinafter described.

Annular member 190 has the rotating part 212 of a labyrinth seal with its extending discs fixed to a surface thereof facing the projection 148. The projection 148 is stepped to receive the varying diameter discs which increase in diameter from the chamber 208 outwardly towards the radial member 196.

A porous sleeve 216 formed of an inert, high temperature resistant material, such as vitrified aluminum oxide, is fixed about the annular projection 148 and positioned against an abutment 218 formed on the flat annular wall 146. The end of the porous sleeve 216 is formed having a flat angular surface in line with the end of the projection 148. This surface cooperates with a surface on a ring 220 of porous material similar to that used for sleeve 216 forming an annular passageway. Ring 220 is fixed to the end of annular member 190 and the adjacent side of radial member 196 for rotation therewith.

A liner member 250 and a cooperating housing sleeve 144A have flanges 256 and 258, respectively, fixed to the flange 150 of the housing extension 144. The liner member 250 forms an annular chamber 260 with the flat wall 146 of the housing extension 144 and the annular porous sleeve 216. The flat wall 146 can be lined if necessary such as the housing sleeve 144A. This annular chamber 260 has an annular opening formed between the outer end of radial member 196 and the liner member 250. This annular opening cooperates with one end of an annular passage through the turbine 209. This passage is formed of a series of stators 262 and blades 264 which extend for the length of the turbine. The stators 262 have their outer ends fixed to the liner member 250 and the inner ends cooperate with labyrinth disc members extending from the rotating portion of the turbine. As stated hereinbefore, the turbine rotor construction is supported by bearing means to permit rotation within the housing sleeve 144A.

The other end of the annular passage through the turbine engages a chamber within the end of the housing sleeve 144A having the flange 145. The chamber 260 has a connecting conduit 280 which leads externally of the liner member 250 and housing sleeve 144A. Conduit 280 is provided with an attaching flange 282.

A passageway 300 in the housing extension 144 is connected at one end to the annular groove 184 formed in the external surface of the assembled halves of a fixed portion of the labyrinth seal arrangement 170. The other end of the passageway 300 is connected by a conduit 302 to a T-connector 304. One of the other branches of the T-connector is connected by a conduit 305 and extending passageway within pump housing 102 to an outlet pressure of the pump. A third branch of the T-connector is connected by a conduit 308 to the output of a pressurized inert gas supply 400. A control mechanism 310 located in conduit 305 is connected to a control mechanism 312 in conduit 308 in a manner to be hereinafter described.

Upon engine start, control device 312 permits the inert gas to pass from its supply 400 through conduit 308, connector 304 and conduit 302 to passageway 300. This flow will continue until the pressure at the outlet connecting point of conduit 305 to the pump reaches its operating pressure at which point the control mechanism 310 will permit the fluid being pumped by pump 100 to pass through conduit 305, connector 304 and conduit 302 to passageway 300, while actuating control 312 to cut off the supply of inert gas through conduit 308. Likewise, when the pressure in line 305 goes below a predetermined value, the control 310 will close conduit 305 and open conduit 308.

Operation

When the device as shown in the figure is mounted for operation, the flange 108 is connected to a flange 1A of a propellant supply and, for example, we will assume it to be liquid oxygen. The flange 110 is connected to a flange 1B which connects the outlet of the pump to a main combustion chamber of a rocket engine. Flanges 145 and 282 are connected to flanges 1C and 1D, respectively, one of which delivers a fluid to operate the turbine 200 and the other of which then directs the fluid which, for example, could be a hydrogen rich gas, to the main combustion chamber of a rocket engine. It is noted that flow of the hydrogen rich gas can be either through conduit 280 into chamber 260 and through the turbine 200 or through the turbine 200 into chamber 260 and out the conduit 280.

When the engine has started and the oxygen in pump 100 has reached its operating pressure, oxygen will flow through passageway 300 to annular groove 184 and then through the passages 182 into the center of the labyrinth seal arrangement. From this point, the oxygen will then leak through this seal arrangement either back into the inlet of the pump or to chamber 260.

In passing to the inlet of the pump the oxygen will pass through the sealing arrangement 170 towards the thrust compensating member 142 and then pass through passages 143, the space between the member 142 and shaft 132, and passages 145 into the bearing unit 130. The oxygen will then flow through the bearing unit to the rear of the impeller 120 and be directed through passageways 141 to the chamber 140. From the chamber 140 the oxygen will pass through passageways 135 to the inlet of the pump. The other path of the oxygen will be through the labyrinth seal arrangement 170 into the annular chamber 208. From here it will be directed through openings 210 into the annular space formed at the inside of the porous sleeve 216 with projection 148. Since the oxygen pressure has been predetermined to be greater than that of the pressure of the hydrogen rich gas in chamber 260, the oxygen will pass through porous sleeve into the chamber 260. From the chamber 208 the oxygen can also pass through labyrinth seal 212 where it will then enter the chamber 260 through the annular passage formed by the ends of projection 148 and sleeve 216 with ring 220.

As stated hereinbefore, hydrogen rich gas can enter chamber 260 either through the turbine 200 or conduit 280. This source of hydrogen rich gas can be preburner in which a mixture which has been burned consisting of oxygen and hydrogen, the mixture being hydrogen rich so that all of the hydrogen will not burn. In the example being described, the oxygen from the pump 100 and the hydrogen rich gas from chamber 260 are both fed into a main combustion chamber ignition.

While an example has been described using oxygen and hydrogen, it is to be understood that other propellants can be used in other engine systems and that the invention is not limited to the specific description above or other specific figures, but may be used in other ways without departure from its spirit as defined by the following claims.

I claim:

1. In combination in an engine having a combustion chamber, an oxidizer supply for burning in said chamber, a fuel supply for burning in said chamber, a pump for one of said fluids having an inlet and outlet, a turbine for driving said pump, drive means interconnecting said turbine and pump, seal means located between said pump and turbine, said seal means having a predetermined leakage, a mixing chamber for burning said leakage, means for directing said leakage into said mixing chamber, means for directing said other fluid into said mixing chamber, said leakage being burned in said chamber, said mixing chamber being connected to said turbine so that the flow path through said turbine and mixing chamber are in series.

2. A combination as set forth in claim 1 wherein said drive means includes a rotating member having a labyrinth seal member located thereon, said pump has a mating fixed labyrinth seal member affixed thereto, and means connects said pump to a point intermediate said labyrinth seal members to provide a predetermined pressure thereto, said pressure providing said predetermined leakage.

3. A combination as set forth in claim 1 wherein the pump is for the oxidizer and the fuel is hydrogen rich gas.

4. A combination as set forth in claim 1 wherein the mixing chamber is annular and surrounds said drive means between said turbine and pump.

5. In combination in an engine having a combustion chamber, an oxidizer supply for burning in said chamber, a fuel supply for burning in said chamber, a housing, one portion of said housing having an impeller mounted therein for rotation, said impeller forming with said housing a pump, said pump pumping one of said fluids, said housing having an inlet and outlet for said pump, another portion of said housing having a turbine rotor mounted therein for rotation, said turbine rotor forming with said housing a turbine, said housing having an opening to said turbine for the passage of said other fluid therethrough, drive means interconnecting said turbine rotor and impeller, seal means located between the pump impeller and housing to control leakage from said pump, a mixing chamber for burning said leakage formed in said housing between said turbine and pump, passage means for directing leakage through said seal means into said mixing chamber, said housing having an opening to said mixing chamber for the passage of said other fluid therethrough, said mixing chamber being connected to said turbine making a flow path through said turbine and mixing chamber in series.

6. In combination in an engine having a combustion chamber, an oxidizer supply for burning in said chamber, a fuel supply for burning in said chamber, a housing, one portion of said housing having an impeller mounted therein for rotation, said impeller forming with said housing a pump, said pump pumping one of said fluids, said housing having an inlet and outlet for said pump, another portion of said housing having a turbine rotor mounted therein for rotation, said turbine rotor forming with said housing a turbine, said housing having an opening to said turbine for the passage of said other fluid therethrough, drive means interconnecting said turbine rotor and impeller, seal means located between said pump impeller and housing to control leakage from said pump, an annular mixing chamber for burning said leakage formed in said housing around said drive means between said turbine and pump, passage means for directing leakage through said seal means radially outwardly into said mixing chamber, said housing having an opening to said mixing chamber for the passage of said other fluid therethrough, said mixing chamber being connected to said turbine making a flow path through said turbine and mixing chamber in series.

7. In combination in an engine having a combustion chamber, an oxidizer supply for burning in said chamber, a fuel supply for burning in said chamber, a housing, one portion of said housing having an impeller mounted therein for rotation, said impeller forming with said housing a pump, said pump pumping one of said fluids, said housing having an inlet and outlet for said pump, another portion of said housing having a turbine rotor mounted therein for rotation, said turbine rotor forming with said housing a turbine, said housing having an opening to said turbine for the passage of said other fluid therethrough, drive means interconnecting said turbine rotor and impeller, seal means located between said pump impeller and housing to control leakage from said pump, said seal means including the rotating part of a labyrinth seal being fixed in relation to said drive means and the mating fixed part of a labyrinth seal being fixed in said housing, a mixing chamber for burning said leakage formed in said housing between said turbine and pump, passage means for directing leakage through said seal means into said mixing chamber, said housing having an opening to said mixing chamber for the passage of said other fluid therethrough, said mixing chamber being connected to said turbine making a flow path through said turbine and mixing chamber in series.

8. In combination in an engine having a combustion chamber, an oxidizer supply for burning in said chamber, a fuel supply for burning in said chamber, a housing, one portion of said housing having an impeller mounted therein for rotation, said impeller forming with said housing a pump, said pump pumping one of said fluids, said housing having an inlet and outlet for said pump, another portion of said housing having a turbine rotor mounted therein for rotation, said turbine rotor forming with said housing a turbine, said housing having an opening to said turbine for the passage of said other fluid therethrough, drive means interconnecting said turbine rotor and impeller, seal means located between said pump impeller and housing to control leakage from said pump, said seal means including the rotating part of a labyrinth seal being fixed in relation to said drive means and the mating fixed part of a labyrinth seal being fixed in said housing, an annular mixing chamber for burning said leakage formed in said housing around said drive means between said turbine and pump, passage means for directing leakage through said seal means radially outwardly into said mixing chamber, said housing having an opening to said mixing chamber for the passage of said other fluid therethrough, said mixing chamber being connected to said turbine making a flow path through said turbine and mixing chamber in series.

9. In combination in an engine having a combustion chamber, an oxidizer supply for burning in said chamber, a fuel supply for burning in said chamber, a housing, one portion of said housing having an impeller mounted therein for rotation, said impeller forming with said housing a pump, said pump pumping one of said fluids, said housing having an inlet and outlet for said pump, another portion of said housing having a turbine rotor mounted therein for rotation, said turbine rotor forming with said housing a turbine, said housing having an opening to said turbine for the passage of said other fluid therethrough, drive means interconnecting said turbine rotor and impeller, seal means located between said pump impeller and housing to control leakage from said pump, said seal means including the rotating part of a labyrinth seal being fixed in relation to said drive means and the mating fixed part of a labyrinth seal being fixed in said housing, said seal means including first passage means extending from said pump to a point intermediate said labyrinth seal to provide a predetermined pressure thereto, said pressure providing a predetermined leakage through said labyrinth seal, a mixing chamber for burning said leakage formed in said housing between said turbine and pump, second passage means for directing leakage through said seal means into said mixing chamber, said housing having an opening to said mixing chamber for the passage of said other fluid therethrough, said mixing chamber being connected to said turbine making a flow path through said turbine and mixing chamber in series.

10. In combination in an engine having a combustion chamber, a oxidizer supply for burning in said chamber, a fuel supply for burning in said chamber, a housing, one portion of said housing having an impeller mounted therein for rotation, said impeller forming with said housing a pump, said pump pumping one of said fluids, said housing having an inlet and outlet for said pump, another portion of said housing having a turbine rotor mounted therein for rotation, said turbine rotor forming with said housing a turbine, said housing having an opening to said turbine for the passage of said other fluid therethrough, drive means interconnecting said turbine rotor and impeller, seal means located between said pump impeller and housing to control leakage from said pump, said seal means including the rotating part of a labyrinth seal being fixed in relation to said drive means and the mating fixed part of a labyrinth seal being fixed in said housing, said seal means including first passage means extending from said pump to a point intermediate said labyrinth seal to provide a predetermined pressure thereto, said pressure providing a predetermined leakage through said labyrinth seal, an annular mixing chamber for burning said leakage formed in said housing around said drive means between said turbine and pump, second passage means for directing leakage through said seal means radially outwardly into said mixing chamber, said housing having an opening to said mixing chamber for the passage of said other fluid therethrough, said mixing chamber being connected to said turbine making a flow path through said turbine and mixing chamber in series.

11. In combination, a housing, one portion of said housing having an impeller mounted therein for rotation, said impeller forming with said housing a pump, said housing having an inlet and outlet for said pump, another portion of said housing having a turbine rotor mounted therein for rotation, said turbine rotor forming with said housing a turbine, said housing having an opening to said turbine for the passage of fluid therethrough, drive means interconnecting said turbine rotor and impeller, seal means located between said pump impeller and housing to control leakage from said pump, an annular chamber formed in said housing around said drive means between said turbine and pump, a porous sleeve positioned around the inner surface of said annular chamber, an annular space formed between said porous sleeve and the inner surface of said annular chamber, passage means for directing leakage through said seal means radially outwardly into said annular space, said porous sleeve forming a mixing chamber with the other part of said annular chamber, said housing having an opening to said mixing chamber for the passage of fluid therethrough, said mixing chamber being connected to said turbine making a flow path through said turbine and mixing chamber in series.

12. In combination in an engine having a combustion chamber, an oxidizer supply for burning in said chamber, a fuel supply for burning in said chamber, a housing, one portion of said housing having an impeller mounted therein for rotation, said impeller forming with said housing a pump, said pump pumping one of said fluids, said housing having an inlet and outlet for said pump, another portion of said housing having a turbine rotor mounted therein for rotation, said turbine rotor forming with said housing a turbine, said housing having an opening to said turbine for the passage of said other fluid therethrough, drive means interconnecting said turbine rotor and impeller, seal means located between said pump impeller and housing to control leakage from said pump, said seal means including the rotating part of a labyrinth seal being fixed in relation to said drive means and the mating fixed part of a labyrinth seal being fixed in said housing, a first annular chamber formed by one end of the labyrinth seal, said drive means and said housing for receiving leakage from said seal means, a second annular mixing chamber for burning said leakage formed in said housing around said first annular chamber between said turbine and pump, passage means for directing leakage from said first annular chamber radially outwardly into said mixing chamber, said housing having an opening to said mixing chamber for the passage of said other fluid therethrough, said mixing chamber being connected to said turbine making a flow path through said turbine and mixing chamber in series.

13. In combination, a housing, one portion of said housing having an impeller mounted therein for rotation, said impeller forming with said housing a pump, said housing having an inlet and outlet for said pump, another portion of said housing having a turbine rotor mounted therein for rotation, said turbine rotor forming with said housing a turbine, said housing having an opening to said turbine for the passage of fluid therethrough, drive means interconnecting said turbine rotor and impeller, first seal means located between said pump impeller and housing to control leakage from said pump, said first seal means including the rotating part of a labyrinth seal being fixed in relation to said drive means and the mating fixed part of a labyrinth seal being fixed in said housing, a first annular chamber formed by one end of the labyrinth seal, said drive means and said housing for receiving leakage from said first seal means, a second annular mixing chamber formed in said housing around said first annular chamber between said turbine and pump, passage means in said housing for directing leakage from said first annular chamber radially outwardly into said mixing chamber, second seal means located in the space between said housing and drive means where they meet adjacent the first annular chamber, said housing having an opening to said mixing chamber for the passage of fluid therethrough, said mixing chamber being connected to said turbine making a flow path through said turbine and mixing chamber in series.

14. In combination, a housing, one portion of said housing having an impeller mounted therein for rotation, said impeller forming with said housing a pump, said housing having an inlet and outlet for said pump, another portion of said housing having a turbine rotor mounted therein for rotation, said turbine rotor forming with said housing a turbine, said housing havng an openng to said turbine for the passage of fluid therethrough, drive means interconnecting said turbine rotor and impeller, seal means located between said pump impeller and housing to control leakage from said pump, said seal means including the rotating part of a labyrinth seal being fixed in relation to said drive means and the mating fixed part of a labyrinth seal being fixed in said housing, said seal means including first passage means extending from said pump to a point intermediate said labyrinth seal to provide a predetermined pressure thereto during pump operation, said pressure providing a predetermined leakage through said labyrinth seal, a mixing chamber formed in said housing between said turbine and pump, second passage means for directing leakage through said seal means into said mixing chamber, said housing having an opening to said mixing chamber for the passage of fluid therethrough, said mixing chamber being connected to said turbine making a flow path through said turbine and mixing chamber in series, third passage means for providing a predetermined pressure to a point intermediate said labyrinth seal just prior to pump starting.

15. In combination, in a rocket engine, a housing, one portion of said housing having an impeller mounted therein for rotation, said impeller forming with said housing a pump, said housing having an inlet and outlet for said pump, a first propellant supply, means connecting said first propellant supply to said pump inlet, another portion of said housing having a turbine rotor mounted therein for rotation, said turbine rotor forming with said housing a turbine, a second propellant supply of a propellant which can ignite upon contact with said first propellant, said turbine being driven by said second propellant supply, said housing having an opening to said turbine for the passage of said second propellant therethrough, drive means interconnecting said turbine rotor and impeller, seal means located between said pump impeller and housing to control first propellant leakage from said pump, a mixing chamber formed in said housing between said turbine and pump, passage means for directing first propellant leakage through said seal means into said mixing chamber, said housing having an opening to said mixing chamber for the passage of said second propellant therethrough, said mixing chamber being connected to said turbine making a flow path through said turbine and mixing chamber in series, said first propellant mixing with said second propellant in said mixing chamber.

16. In combination, in a rocket engine, a housing, one portion of said housing having an impeller mounted therein for rotation, said impeller forming with said housing a pump, said housing having an inlet and outlet for said pump, a first propellant supply, means connecting said first propellant supply to said pump inlet, another portion of said housing having a turbine rotor mounted therein for rotation, said turbine rotor forming with said housing a turbine, a second propellant supply of a propellant which can ignite upon contact with said first propellant, said turbine being driven by said second propellant supply, said housing having an opening to said turbine for the passage of said second propellant therethrough, drive means interconnecting said turbine rotor and impeller, seal means located between said pump impeller and housing to control first propellant leakage from said pump, said seal means including the rotating part of a labyrinth seal being fixed in relation to said drive means and the mating fixed part of a labyrinth seal being fixed in said housing, said seal means including first passage means extending from said pump to a point intermediate said labyrinth seal to provide a predetermined pressure thereto during pump operation, said pressure providing a predetermined leakage through said labyrinth seal, a mixing chamber formed in said housing between said turbine and pump, second passage means for directing first propellant leakage through said seal means into said mixing chamber, said housing having an opening to said mixing chamber for the passage of said second propellant therethrough, said mixing chamber being connected to said turbine making a flow path through said turbine and mixing chamber in series, said first propellant mixing with said second propellant in said mixing chamber, an inert fluid supply, third passage means extending from said inert fluid supply to a point intermediate said labyrinth seal to provide a predetermined pressure thereto just prior to pump starting.

References Cited

UNITED STATES PATENTS

| | | | |
|---|---|---|---|
| 2,614,386 | 10/1952 | McLeod | 60—39.08 |
| 2,646,210 | 7/1953 | Kohlmann | 230—116 |
| 3,133,693 | 5/1964 | Holl | 230—204 |

CARLTON R. CROYLE, *Primary Examiner.*

MARK M. NEWMAN, *Examiner.*

D. HART, *Assistant Examiner.*